May 13, 1941.   K. RABE   2,241,827

VEHICLE SPRING SUSPENSION

Filed July 27, 1938   2 Sheets-Sheet 1

Inventor
KARL RABE
By
Attorneys

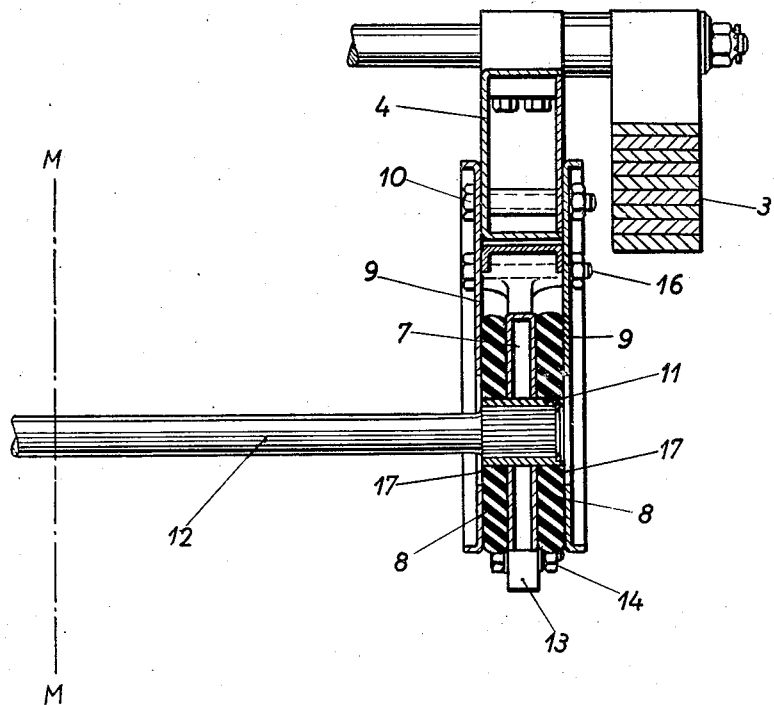

Patented May 13, 1941

2,241,827

UNITED STATES PATENT OFFICE 2,241,827

VEHICLE SPRING SUSPENSION

Karl Rabe, Stuttgart, Germany, assignor to Dr. ing. h. c. F. Porsche, K.-G., Stuttgart-Zuffenhausen, Germany, a company of Germany Application July 27, 1938, Serial No. 221,501
In Germany August 3, 1937

12 Claims. (Cl. 267—21)

This invention relates to a vehicle spring suspension, and is particularly concerned with an arrangement having progressively operating springing.

An object of this invention is the provision of an improved spring suspension for vehicles.

Another object of this invention is the novel arrangement of supplemental springs acting together with the usual vehicle spring arrangement.

A further object of this invention is the novel combination of my supplemental springs in addition to the usual vehicle springs, together with an equalizing device interconnecting opposite vehicle wheels and acting through the supplementary springs.

A still further object of my invention is the provision of rubber discs acting under twisting forces as supplementary springs and bringing about a total springing having a progressive characteristic.

Other objects and advantages of this invention will be apparent from the following description of a preferred embodiment of my construction taken in connection with the drawings wherein:

Fig. 3 is a cross-sectional view along the line III—III of Fig. 1.

Figure 1:
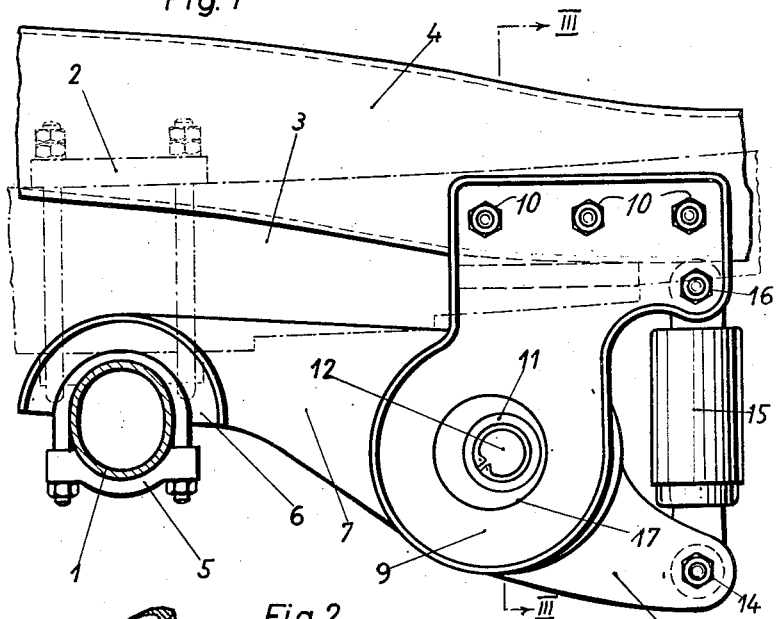
Fig. 1 is a side view, partially in cross-section, of a preferred form of my invention.
Figure 2:
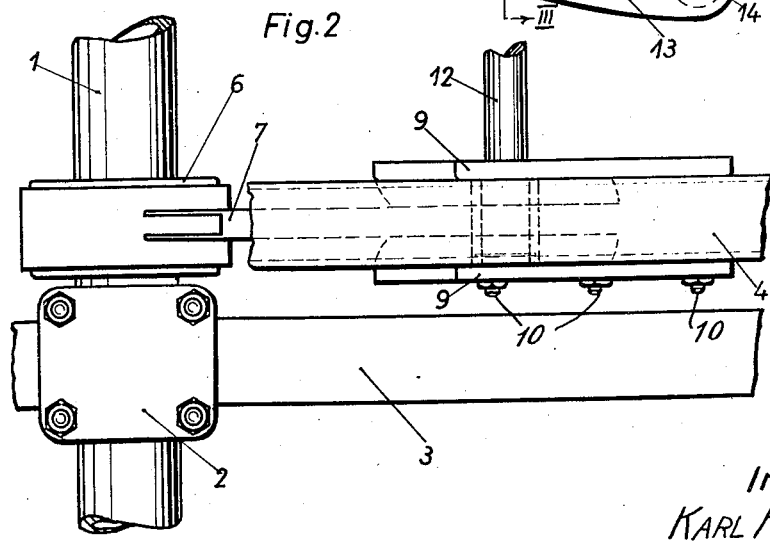
Fig. 2 is a top plan view of the construction illustrated in Fig. 1.

In the form of the invention illustrated, an axle or axle tube 1 is interconnected by usual means such as the bridging plate 2 with a leaf spring 3, which, on its part is interconnected with the frame 4 of a vehicle by means not illustrated. Through a housing member 5 fastened thereto in any desired manner and preferably also through a rubber mounting 6 attached to the member 5, a double lever 7 is pivotally mounted upon the axle tube 1. A pair of rubber discs 8 are mounted with their inner faces upon a portion of the double lever 7 as is best shown in Fig. 3. The outer faces of these discs 8 are attached to vertical plates 9 which are made rigid with the frame 4 by suitable means such as the nuts and bolts 10. The lever arm 7 is preferably formed with a hub 11. At its connection with the discs 8 this hub 11 may serve as an attachment for an equalizing device such as a torsion shaft 12 which will extend over across the vehicle as, for example, over the plane M—M to a similar hub on the other side of the vehicle (not shown). The rubber parts including the mounting 6 and the discs 8 are attached to their respective metallic elements in any suitable manner known to the art.

The double lever 7 may, if desired, be provided with an extension 13 having a pivot 14 to which one end of a shock absorber 15 may be attached. The other end of the shock absorber is pivotally mounted relative to the frame or the plates 9 through the pivotal connection 16.

The plates 9 which support one face of the rubber discs 8 relative to the frame are preferably provided with openings 17 in the vicinity of the hub 11. These openings permit relative transverse and axial movement of the equalizing shaft 12 so that twisting of the frame and tolerances in construction are permitted without affecting the operation of any of the parts, while at the same time permitting free operation of the supplemental springs and stabilizing devices.

It will be seen from a study of the above described construction that the leaf springs will operate in their ordinary fashion but that the total springing will be affected by the use of the rubber discs as supplemental springs. If the rubber discs 8 are initially compressed between the outer faces of the double lever 7 and the inner faces of the vertical plates 9, they will add a progressive characteristic to the total springing effect. Twisting of the inner faces of the disc due to up and down movement of the double lever 7 through up and down movement of the axle tube 1 will be transformed into a pushing action against the inside faces of the plates 9 thus increasing the resistance of the springs very greatly corresponding to the movements of the lever and axle. Because of this type of connection whereby the greatest strength of the rubber is utilized, the springs may be highly loaded. Since their outer surfaces are exposed to the cooling action of the passing air, the heat arising in the rubber through hysteresis is quickly conducted away. The flow of heat is aided by the fact that the rubber discs have a relatively large cross-section relative to their width and by the fact that they are connected to relatively large cooling surfaces.

It will be noted that the rubber discs 8 not only act as supplemental springs to the main spring such as the leaf springs 3 but also act as a resilient shiftable abutment for the equalizing shaft 12. They accordingly perform a double springing function.

It will be obvious to those skilled in this art that many modifications of this invention are possible. Instead of leaf springs, other types of main springs such as torsion springs, coil springs and rubber springs may be used. Furthermore, while the suspension has been described in connection with a vehicle having a stiff transverse axle, it is equally applicable to an independent wheel suspension. The lever arms 7 while shown as interconnected with the main axle tube through a rubber mounting may be interconnected therewith in any manner providing pivotal movement between these parts. The stabilizing shaft 12 may be of any construction as for example the ordinary shaft shown, or a tubular shaft or one having any desired configuration. The type of shock absorber is unimportant and may be of any of the conventional mechanically or hydraulicly operating forms.

Other changes coming within the scope of the appended claims are deemed as forming part of this invention.

I claim:

1. In a vehicle having a frame, a wheel supporting axle, and a main spring intermediate said axle and said frame, in combination with a pair of rubber discs, means for attaching the outer faces of said discs to said frame, a lever arm mounted at one end for movement with said axle and at its other end connected to the inner faces of said discs, said lever arm being formed with an extension beyond its connection with said discs, and a shock absorber having a pair of relatively movable elements, one of which is attached to said lever arm and the other to said frame.

2. In a vehicle having a frame, a wheel supporting axle, and a main spring intermediate said axle and said frame, in combination with a pair of rubber discs, means for attaching the outer faces of said discs to said frame, and a lever arm mounted at one end for movement with said axle and at its other end connected to the inner faces of said discs, said discs being initially compressed between said frame and said lever arm.

3. In a vehicle having a frame including a longitudinally extending side beam, a wheel supporting axle, and a main spring intermediate said axle and said frame, in combination with a rubber disc having one face attached to the side beam of said frame, a lever arm mounted at one end for movement with said axle and at its other end connected to the other face of said rubber disc, said lever being formed with an extension beyond its connection with said disc, and a shock absorber having a pair of relatively movable elements, one of which is attached to said lever arm and the other to said frame.

4. In a vehicle having a frame, in combination, a wheel supporting axle extending transversely of said frame, a pair of main springs each intermediate one end of said axle and said frame, a pair of twistable spring devices each having a portion attached to said frame near opposite ends of said axle, a pair of lever arms each attached at one end to opposite ends of said axle and at the other end to the corresponding twistable spring device, and a straight equalizing shaft interconnecting said lever arms.

5. In a vehicle having a frame, in combination, a wheel supporting axle extending transversely of said frame, a pair of main springs each intermediate one end of said axle and said frame, a pair of rubber discs each having one face attached to said frame near opposite ends of said axle, a pair of lever arms each attached at one end to opposite ends of said axle and at the other end to the other face of the corresponding disc, and an equalizing shaft interconnecting said lever arms, and extending substantially co-axially with said rubber discs.

6. In a vehicle having a frame, in combination, a wheel supporting axle extending transversely of said frame, a pair of main springs each intermediate one end of said axle and said frame, a pair of rubber discs each having one face attached to said frame near opposite ends of said axle, a pair of lever arms each attached at one end to opposite ends of said axle and at the other end to the other face of the corresponding disc, and a torsion spring interconnecting said lever arms, said torsion springs being connected to said lever arms at substantially their place of attachment to their respective rubber discs.

7. In a vehicle having a frame including a pair of opposite longitudinal side beams, a wheel supporting axle extending transversely of said frame, a pair of main springs, one interconnected between each end of said axle and said frame, a pair of vertical plates attached to each side beam, a pair of rubber discs mounted within each pair of plates, a pair of lever arms, one attached to each end of said axle at one end, and to each pair of rubber discs at their other ends, and a straight equalizing shaft interconnecting said lever arms.

8. In a vehicle having a frame including a pair of opposite longitudinal side beams, a wheel supporting axle extending transversely of said frame, a pair of main springs, one interconnected between the end of said axle and said frame, a pair of vertical plates attached to each side beam, a pair of rubber discs mounted within each pair of plates, a pair of lever arms, one attached to each end of said axle at one end and to each pair of rubber discs at their other end, a torsion spring interconnecting said lever arms at their respective points of attachment with corresponding pair of rubber discs, said plates being provided with openings for permitting transverse axial shifting of said torsion spring.

9. In a vehicle having a frame including a pair of opposite longitudinal side beams, a wheel supporting axle extending transversely of said frame, a pair of main springs, one interconnected between each end of said axle and said frame, a pair of vertical plates attached to each side beam, a pair of rubber discs mounted within each pair of plates, two lever arms, one attached to each end of said axle at one end and to each pair of rubber discs at their other end, said lever arms having the form of a pair of interconnected spaced arms and said rubber discs being initially compressed between opposite outer faces of said spaced arms and opposite inner faces of said plates, and an equalizing shaft interconnecting said lever arms.

10. In a vehicle having a frame including a pair of opposite longitudinal side beams, a wheel supporting axle extending transversely of said frame, a pair of main springs, one interconnected between each end of said axle and said frame, a pair of vertical plates attached to each side beam, a pair of rubber discs mounted within each pair of plates, a pair of lever arms, one attached to each end of said axle at one end, and to each pair of rubber discs at their other end, said lever arms being provided with extensions projecting beyond said rubber discs, a pair of shock absorbers, each pivotally interconnected between an extension and the pair of vertical plates, and an equalizing shaft interconnecting said lever arms.

11. In a vehicle having a frame, in combination, a wheel supporting member on one side of said frame, a main spring intermediate said wheel supporting member and said frame, a rubber disc having one face thereof interconnected with said frame, means interconnected with said wheel supporting member for rotating the other face of said rubber disc upon up and down movement of said wheel supporting member, a corresponding wheel supporting member, main spring, rubber disc, and interconnecting means on the other side of the vehicle frame, and a stabilizing device interconnecting said lever arms at their respective points of attachment with the rubber discs.

12. In a vehicle having a frame including a pair of opposite longitudinal side beams, a wheel supporting axle extending transversely of said frame, a pair of main springs, one interconnected between each end of said axle and said frame, a pair of vertical plates attached to each side beam, a pair of rubber discs mounted within each pair of plates, a pair of lever arms, one attached to each end of said axle at one end, and to each pair of rubber discs at their other ends, said lever arms being provided with a hub co-axial with said rubber discs, and said vertical plates being provided with openings about said hub, and an equalizing shaft interconnecting said lever arms through said hub.

KARL RABE.